United States Patent [19]
English

[11] 3,798,506
[45] Mar. 19, 1974

[54] POWER CONTROL DEVICE WITH HEAT TRANSFER MEANS

[75] Inventor: James William English, Dallas, Tex.
[73] Assignee: Atmos Corporation, Carrollton, Tex.
[22] Filed: Nov. 15, 1972
[21] Appl. No.: 306,729

[52] U.S. Cl............ 317/100, 174/DIG. 5, 174/15 R
[51] Int. Cl. ............................................. H05k 7/20
[58] Field of Search........ 338/57; 174/DIG. 5, 15 R, 174/16 R; 317/117, 100

[56] References Cited
UNITED STATES PATENTS

| | | | |
|---|---|---|---|
| 2,984,774 | 5/1961 | Race | 174/DIG. 5 |
| 3,143,592 | 8/1964 | August | 317/100 |
| 3,566,959 | 3/1971 | Koltuniak | 174/DIG. 5 |
| 3,303,392 | 2/1967 | Zelina | 317/100 |

OTHER PUBLICATIONS
IBM Tech. Discl. Bull., Conformal Heat Sink Device, Pergl, Vol. 13, No. 9, Feb. 1971.

IBM Tech. Discl. Bull., Heat Conducting Washer, Donegan and Franklin, Vol. 8, No. 1, June 1965.

Primary Examiner—Herman Hohauser
Assistant Examiner—Gerald P. Tolin
Attorney, Agent, or Firm—John E. Holder

[57] ABSTRACT

The particular embodiment described herein as illustrative of one form of the invention utilizes a wall plate for mounting a power control device such that the control device is received within a wall opening and a knob or the like projects outwardly therefrom for operating the device. A heat transfer member is utilized which makes a terminal connection between electrical wires and portions of the control device. The heat transfer member provides an electrical insulation barrier and at the same time transmits heat generated by the control device through the wall plate to a cover, with the cover being isolated from the face plate.

12 Claims, 4 Drawing Figures

PATENTED MAR 19 1974 3,798,506

POWER CONTROL DEVICE WITH HEAT TRANSFER MEANS

BACKGROUND OF THE INVENTION

This invention rleates to a power control device and more particularly to an apparatus for dissipating heat generated by such a control device.

A commonly used apparatus for controlling power to incandenscence lights, for example, includes a thyristor or the like which is positioned within the electrical light circuit and by means of a knob can be operated to control the power supplied to the light system. Such a power control is used to affect dimming of the lights or otherwise to control power applied to an electrically operated system. Where high rates of power are involved, for example, in lighting systems which utilize a substantial level of power, a considerable amount of heat energy may be developed in such a control device. Typically such devices for commercial use must meet certain criteria or standards which are imposed by regulatory bodies. One such example of this is the Underwriters Laboratores (UL) approval which is a standard commonly specified for electrical equipment and serves as a general certification of safety for use. In the instance of the dimmer switches described above, restrictions have been imposed by UL, for its approval, which limit the temperature rise in such an apparatus at its various parts, when it is being operated, in order to protect the wall or surrounding areas from heat and thus the danger of fire. For example, in such a dimmer switch the temperature rise is limited to 30°C at the point that the wiring enters the housing enclosing the power controls. This portion of the switch would normally be positioned within a wall. A 35°C temperature rise is permitted on the outside housing case whereas the wall plate itself may experience a 65°C temperature rise.

It is therefore an object of the present invention to provide a new and improved power control device for effectively dissipating heat generated by such a device in order to improve its safety characteristics.

SUMMARY OF THE INVENTION

With this and other objects in view, the present invention contemplates a power control device including a heat sink, chassis or mounting plate, and a heat generating power control mounted on one side thereof. A terminal is provided on such one side of the mounting plate and serves as a means for connecting electrical wires to the power control. The terminal is connected to a heat transfer means, which is electrically insulated from the terminal, and which provides a means for readily transferring heat from the terminal through the mounting plate and into communication with a cover on the other side of the mounting plate. The cover has a fairly extensive surface area for dissipating the heat from the terminal and is isolated from the mounting plate.

Other features are provided in the apparatus to facilitate the dissipation of heat generated in the control device.

DESCRIPTION OF THE PREFERRED EMBODIMENTS

Figure 1:
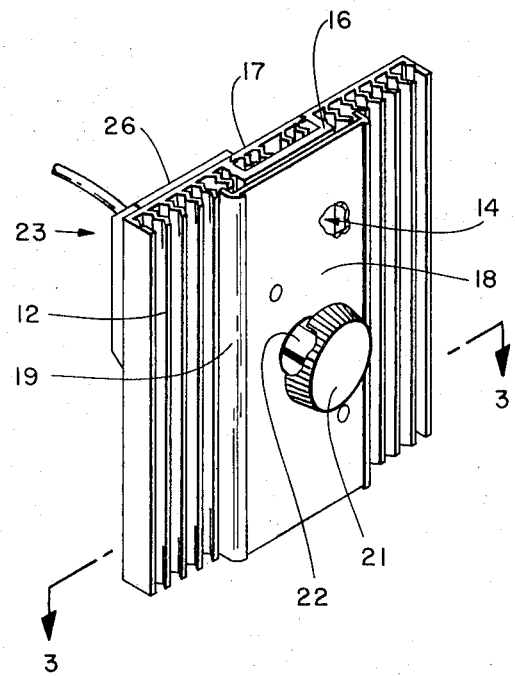
FIG. 1 is a perspective view of a power control and mounting plate.

Referring first to FIG. 1 of the drawings, a complete assembly of a power control device is shown including a metal wall mounting plate having longitudinal ribs 12 extending therefrom. The wall plate may be machined or extruded from aluminum or other metal having good heat conductivity characteristics. The ribs are of a corrugated configuration to provide for a greater surface area, the purpose of which will be hereinafter described. Toward the center of the mounting plate an outwardly formed channel portion 14 is shown having a wall dimension 16 greater than that of the remainder of the mounting plate. A sliding back plate 17 is positioned within an opening opposite the face of the channel which back plate is shown in greater detail in FIG. 4.

Also shown in FIG. 1 is a metal wall plate cover 18 which is positioned over the channel portion 14 of the mounting plate and has inwardly formed shoulders 19 which are received between outwardly extending ribs 12 on the mounting plate. A plastic control knob 21 is shown for connection to a shaft 22 projecting from a power control device.

Figure 2:
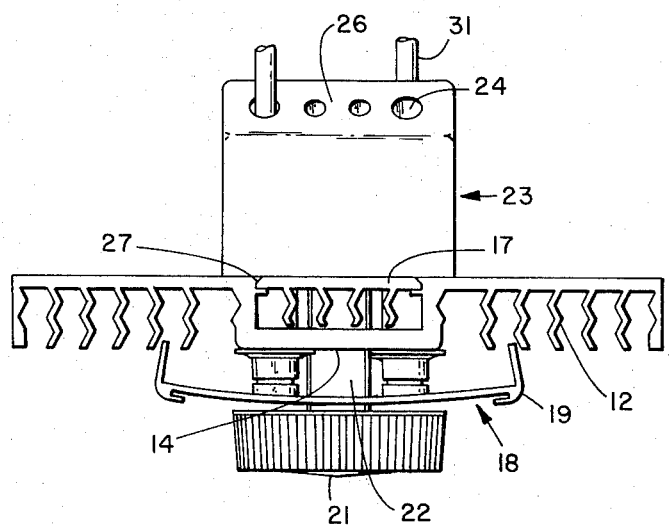
FIG. 2 is a plan view of the power control and mounting plate shown in FIG. 1.

Referring to FIG. 2 of the drawings, the assembly is shown in greater detail having a plastic housing 23 positioned on the back side of the mounting plate with the housing being arranged to cover portions of the power control. Openings 24 are provided along top and bottom beveled shoulder portions 26 on the housing to permit entry of wires therein so that the power control may be interconnected with a circuit and thereby effect the control of power being supplied to such a circuit.

Also shown in FIG. 2 is the metal back plate 17 which is slidably received within grooved wall portions 27 which are oppositely formed in the wall plate at the base of the outwardly extending channel portion 14. The longitudinal grooves are formed to receive complimentary shaped portions on the outer longitudinal edge on the back plate 17. This permits removal of the back plate as shown more clearly in FIG. 4. The control device which is contained within housing 23 normally includes a variable resistive element which is connected to the shaft 22. The shaft 22 projects through back cover 17, channel 14, and cover 18 for connection with knob 21 to provide control of the device. Insulated electrical wires 31 are shown extending through openings 24 in the back of housing 23 to provide electrical connection with the power control.

Figure 3:
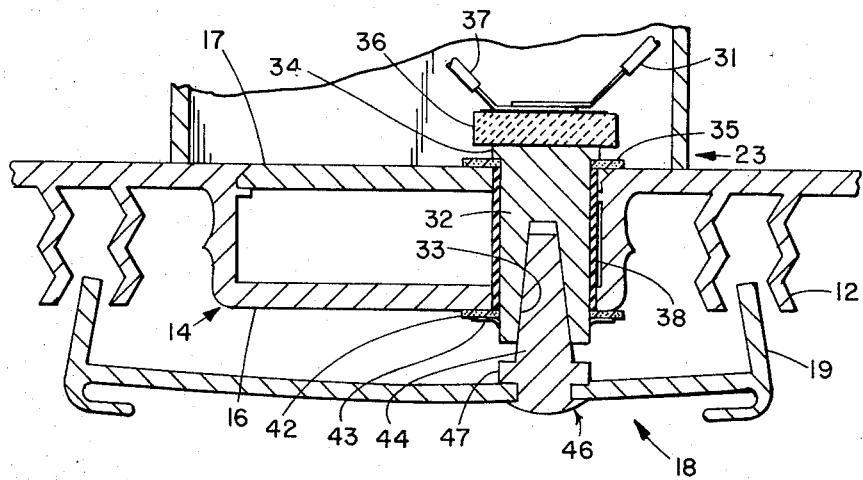
FIG. 3 is a partial cross sectional plan view of the control device taken along lines 3—3 of FIG. 1.

Referring next to FIG. 3 of the drawing, apparatus is shown in greater detail for transferring heat emanating from the power control from within the housing 23, outwardly through the wall plate and into communication with the cover 18. The cross sectional view of FIG. 3 is taken along lines 3—3 of FIG. 1 and shows only one of two such transfer apparatus which connect the cover 18 with the control device.

The transfer apparatus includes a terminal rod 32 made of a metal such as brass and having a tapered socket portion 33 formed in one end thereof. The opposite end of terminal rod 32 has an enlarged shoulder portion 34. A ceramic disk 36 has metallized end surfaces which permit soldering thereto. In this case, the shoulder 34 on the brass terminal rod is soldered to the one side of the ceramic disk 36. The other side of the ceramic disk has circuit wire 31 soldered thereto together with another wire 37 also soldered to the disk and thus electrical contact with the wire 31 to permit transfer of electrical power from a power supply circuit to the power control located within the housing 23. In assembling the transfer apparatus, an asbestos washer 35 is placed about the terminal rod between the shoulder 34 and the back cover 17. The terminal rod extends through a hole in the back cover and another opening in the wall 16 of the channel 14. A thermal shrinking plastic sleeve 38 is shrunk fitted about the terminal rod and provides an insulating medium between the terminal rod and surrounding portions of the mounting plate. In assembly, a second asbestos washer 42 is placed about the terminal rod against the outer surface of the channel 14 and is held in place by a brass retaining ring 43. A tapered pin 44 which is sized to be received within the tapered opening 33 in the end of the terminal rod, is riveted as at 46 to the cover 18. A shoulder 47 on the tapered pin provides means for maintaining the pin in its riveted posiion on the cover. In assembly, the pin is positioned in the tapered socket of the terminal rod with the tapered fit maintaining the cover in assembly with the wall plate.

In final assembly, heat shrinkable plastic sleeves (not shown) are also shrink fitted about the ceramic disk and wire leads attached to the disk.

Figure 4:
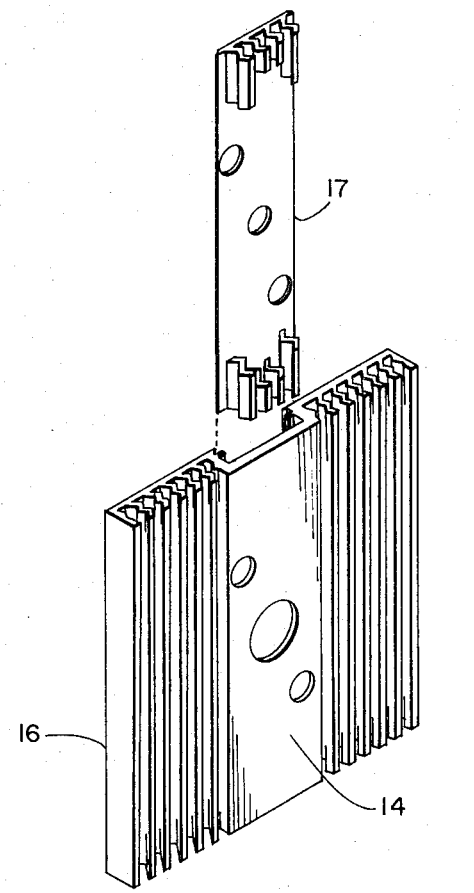
FIG. 4 is a partially disassembled view of the power control mounting plate.

Referring now to FIG. 4 of the drawings, the sliding back cover 17 is shown disassembled from the face plate. Short segments of heat dissipating ribs are positioned at the top and bottom of the cover on one side thereof. Such ribs are absent however, from the central portion of the cover to afford free circulation of air about portions of the apparatus which may be carrying heat from the control device. For example, particular portions of the control device such as a triac or the like may extend outwardly from the housing 23 and through the wall of the cover plate 17 into such hollow interior portion within the channel 14. This permits heat generated by such devices to be absorbed in the ribbed wall plate. The general absence of ribs within channel 14 on cover plate 17 also promotes the circulation of air through a chimney effect and facilitates heat transfer to the air. Heat which is generated within the control apparatus and sinks through circuit wires to the terminals provided on one side of the ceramic disk is transferred by means of the ceramic disks into the brass terminal rods and then carried by means of the such terminal rods to the cover plate for dissipation outside the face plate assembly. Thus, the ceramic disk provides an electrical insulation between the electrical terminals and the cover plate but at the same time provides an effective heat transfer path to the cover plate. The remainder of the assembly with its corrugated ribs is designed to carry heat away from the control apparatus located within the wall and housed inside housing 23 to the outside of the wall where such heat is dissipated to the surrounding air as efficiently as possible.

While a particular embodiment of the present invention has been shown and described, it is apparent that changes and modifications may be made without departing from this invention in its broader aspects, and therefore the aim in the appended claims is to cover all such changes and modifications as fall within the true spirit and scope of this invention.

What is claimed is:

1. In a power control device adapted for mounting on a wall or the like, means for transferring heat from one portion of the device to another for dissipation of such heat, which means comprises: plate means for mounting said device to an object; heat generating control means mounted on one side of said plate means; terminal means for providing electrical power to said control means; cover means on the other side of said plate means and isolated from said plate means; and transfer means for providing a thermal conduction path from said terminal means to said cover means, said transfer means electrically insulating said terminal means from said cover means.

2. The apparatus of claim 1 wherein said cover means is spaced from said plate means.

3. The apparatus of claim 1 wherein said transfer means includes a ceramic member.

4. The apparatus of claim 1 wherein said plate means includes elongated ribs on the other side of said plate means for providing heat conducting surfaces.

5. A power control device adapted for mounting on a wall surface, comprising: wall plate means; power control means mounted on one side of said wall plate means; terminal means on said one side of said wall plate means for providing electrical power to said control means; heat transfer means connected with said terminal means and extending through said wall plate means to the other side of said wall plate means; and cover means on the other side of said wall plate means and connected to said transfer means thereby conducting heat from said transfer means to said cover means.

6. The apparatus of claim 5 wherein said transfer means includes a metalized ceramic disk having a heat conductive extension with a bore portion, and wherein said cover means includes a heat conductive pin means extending transversely therefrom and sized for reception within said bore portion.

7. The apparatus of claim 6 wherein said bore portion and pin are tapered to provide a tapered fit when engaged.

8. The apparatus of claim 6 and further including insulating means positioned about said heat conductive extension.

9. The apparatus of claim 5 and further including shaft means extending from said control means through said wall plate means and through said cover means, and a knob position on the end of said shaft extending through said cover means.

10. An apparatus for mounting a power control means on a wall surface comprising: wall mounting means; longitudinal parallel ribs formed on one side of said wall mounting means; U-shaped channel formed on said one side of said wall mounting means, said wall mounting means having a longitudinal opening in its surface opposite said U-shaped channel; and plate means having ribs formed at its upper and lower ends and received in said opening to form a partially enclosed channel on one side of said mounting means with the upper and lower ribs received within said partially enclosed channel.

11. The apparatus of claim 10 wherein said wall mounting means has grooved surfaces of each side of said longitudinal opening and said plate means has edge surfaces slidably received within said grooves.

12. The apparatus of claim 11 wherein said plate means has longitudinal ribs formed on a portion of its surface.

* * * * *